United States Patent
Yamashita et al.

(10) Patent No.: US 7,104,501 B2
(45) Date of Patent: Sep. 12, 2006

(54) BLADE MEMBER FOR AIRPLANE

(75) Inventors: Daiya Yamashita, Greensboro, NC (US); Fumihiko Shikano, Saitama (JP); Hiroshi Kato, Saitama (JP); Akira Kaneko, Saitama (JP); Takumi Shibata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/619,623

(22) Filed: Jul. 16, 2003

(65) Prior Publication Data

US 2004/0124310 A1 Jul. 1, 2004

(30) Foreign Application Priority Data

Jul. 17, 2002 (JP) ............................. 2002-208699

(51) Int. Cl.
*B64C 3/20* (2006.01)
(52) U.S. Cl. .................................................. 244/123.3
(58) Field of Classification Search ................ 244/123; 416/232, 233
See application file for complete search history.

(56) References Cited

U.S. PATENT DOCUMENTS

| | | | |
|---|---|---|---|
| 1,552,112 A * | 9/1925 | Clark ........................ 244/123 |
| 2,412,908 A * | 12/1946 | Platt et al. .................. 416/226 |
| 2,615,520 A * | 10/1952 | Liedholm ................... 416/233 |
| 2,652,897 A * | 9/1953 | Le Compte ................. 416/233 |
| 2,698,666 A * | 1/1955 | Camping et al. ........... 416/233 |
| 2,715,598 A * | 8/1955 | Rees et al. .................. 428/166 |
| 2,782,862 A * | 2/1957 | Wright ....................... 416/233 |
| 3,729,155 A * | 4/1973 | Huet ........................... 244/123 |
| 4,081,652 A * | 3/1978 | Janicke et al. ........... 219/69.12 |
| 5,269,057 A * | 12/1993 | Mendham ................... 29/889.1 |
| 5,499,904 A * | 3/1996 | Wallace et al. ............. 416/230 |

\* cited by examiner

*Primary Examiner*—Tien Dinh
(74) *Attorney, Agent, or Firm*—Birch. Stewart, Kolasch & Birch, LLP

(57) ABSTRACT

It is an object to provide a blade member for an airplane which is simple in structure, and moreover is excellent with respects to weight, aerodynamic performance, cost, strength and durability. A vane of a double-slotted flap includes: an outer skin area surrounded by a first outer skin, a second outer skin, a leading edge and a trailing edge each having a predetermined wall thickness. Front and rear reinforcing areas are provided that extend in a span direction within the outer skin area and are connected to the first outer skin and the second outer skin. The outer skin area and the reinforcing areas are integrally formed by wire electrical discharge-machining. The first outer skin and the second outer skin respectively have thickened portions thicker than the other portions, and the trailing edge is formed to have a thickness which is approximately zero. This blade member can be simplified in structure, leading to reductions in the number of parts, number of assembling steps and weight. Moreover, no step nor seam is generated on a surface of the blade member, and hence it is possible to prevent an increase in drag and the generation of corrosion.

8 Claims, 3 Drawing Sheets

BLADE MEMBER FOR AIRPLANE

CROSS-REFERENCE TO RELATED APPLICATIONS

The present nonprovisional application claims priority under 35 USC 119 to Japanese Patent Application No. 2002-208699 filed on Jul. 17, 2002 the entire contents thereof is hereby incorporated by reference.

BACKGROUND OF THE INVENTION

1. Field of the Invention

The present invention relates to a blade member for an airplane, which constitutes at least a portion of a rotor blade of the airplane.

2. Description of Background Art

A double-slotted flap mounted at a trailing edge of a main wing of an airplane includes a vane disposed between the main wing and a flap body at a lowered position so that two slots are formed to allow air currents to flow along upper and lower surfaces of the vane.

Such a conventional small-sized blade member for the airplane employs a sandwich structure in which a honeycomb core is covered with a skin, for example, see U.S. Pat. No. 5,356,688 and Japanese Patent Application Laid-open No. 63-166698, or a split structure in which a rib and a skin are coupled to each other by rivets.

However, either the conventional sandwich structure or the conventional split structure has various problems such as an increase in the number of parts, an increase in assembling steps, an increase in weight, an increase in drag due to a step formed between the parts and the generation of corrosion due to water entering the blade member through a gap between the parts, because a plurality of parts are assembled to constitute the blade member for the airplane.

SUMMARY AND OBJECTS OF THE INVENTION

The present invention overcomes the problems of the prior art. It is an object of the present invention to provide a blade member for an airplane, which is simple in structure, and moreover is excellent with respect to weight, aerodynamic performance, cost, strength, rigidity and durability.

To achieve the above object, according to the present invention, there is proposed a blade member for the airplane, which constitutes at least a portion of a rotor blade of the airplane. The blade member includes an outer skin area surrounded by a first outer skin, a second outer skin, a leading edge and a trailing edge each having a predetermined wall thickness and at least one reinforcing area extending in a span direction within the outer skin area and connected to the first outer skin and the second outer skin. The outer skin area and the reinforcing area are integrally formed by wire electrical discharge machining.

With the above arrangement, the outer skin area surrounded by the first outer skin, the second outer skin, the leading edge and the trailing edge each having the predetermined wall thickness is formed integrally with the reinforcing area extending in the span direction within the outer skin area and connected to the first outer skin and the second outer skin by wire electrical discharge machining, to thereby manufacture the blade member for the airplane. Therefore, the structure can be simplified, leading to reductions in the number of parts, the number of assembling steps and the weight, as compared with the conventional blade member for the airplane made by assembling the plurality of parts. Moreover, no step nor seam is generated on a surface of the outer skin area, so that the increase in drag and the generation of corrosion can be prevented.

According to the present invention, at least one of the wall thickness of the first outer skin and the second outer skin changes in a cord direction.

With the above arrangement, the wall thickness of the outer skin changes in the cord direction, so that the bending rigidity and the torsional rigidity of the blade member for the airplane can be optimized while minimizing the increase in weight. Especially, the wall thickness of the outer skin can be easily changed in the cord direction by employing wire electrical discharge machining.

According to the present invention, a distance between the outer surfaces of the first outer skin and the second outer skin is gradually decreasing toward the trailing edge to become approximately zero at the trailing edge.

With the above arrangement, the distance between the outer surfaces of the first outer skin and the second outer skin is gradually decreasing toward the trailing edge to become approximately zero at the trailing edge, so that the turbulence of an air current at the trailing edge can be prevented to contribute to a reduction in drag. Especially, the wall thickness of the trailing edge can be easily reduced by employing wire electrical discharge machining.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The mode for carrying out the present invention will now be described by way of an embodiment of the present invention with reference to the accompanying drawings.

Figure 1:
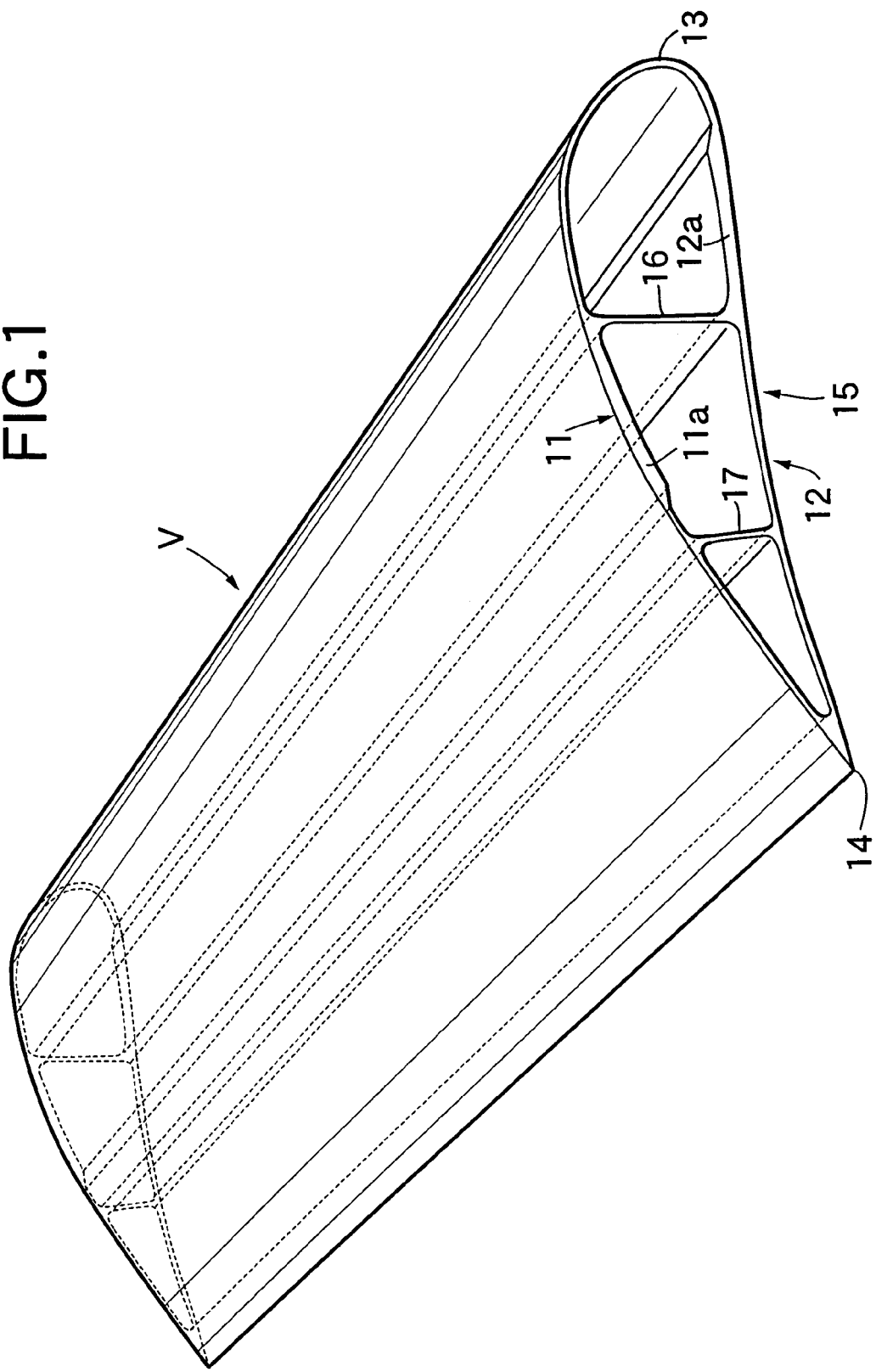
FIG. 1 is a perspective view of a vane of a double-slotted flap.
Figure 2:
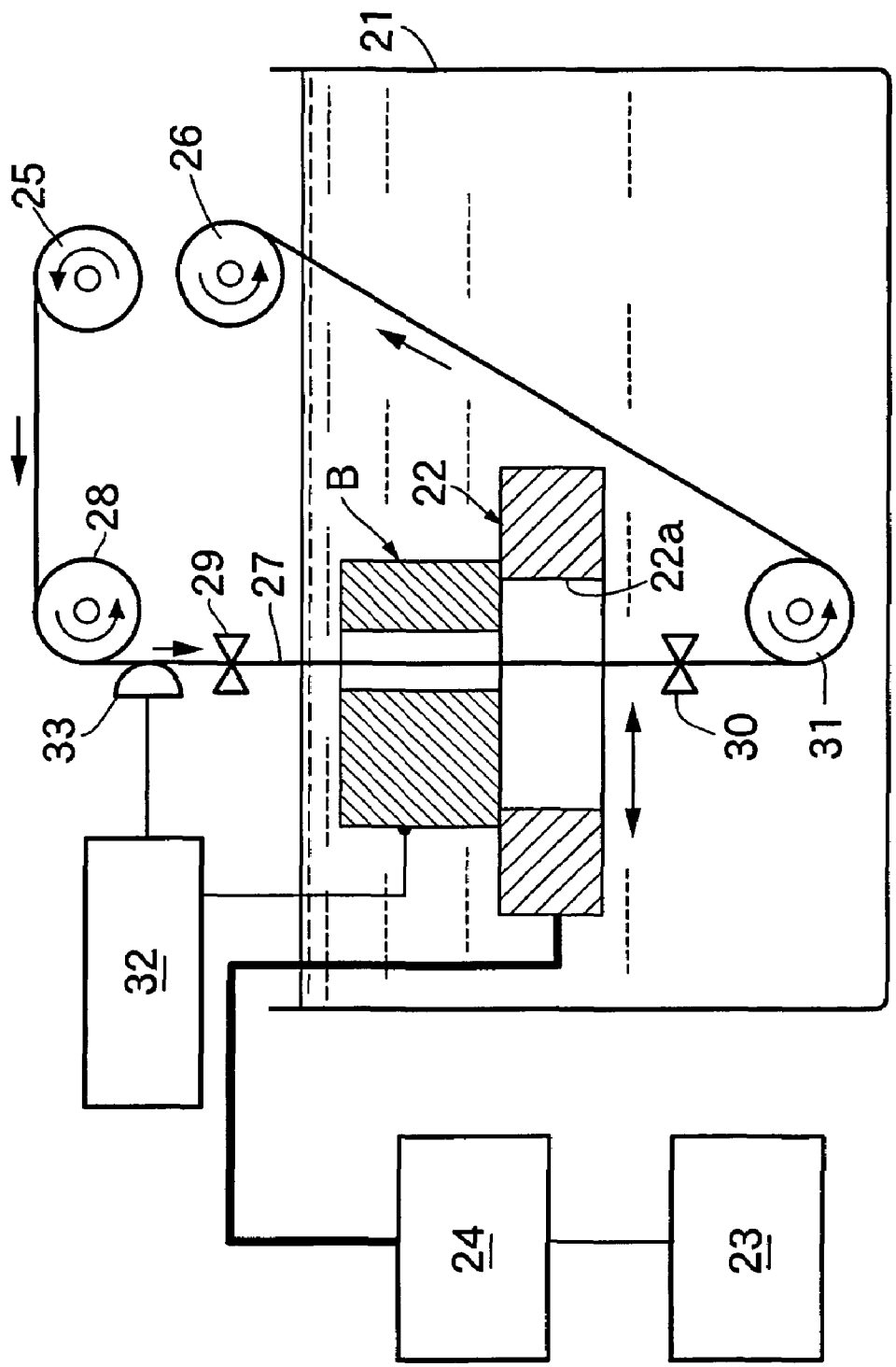
FIG. 2 is a view of the entire arrangement of an electrical discharge machining apparatus.
Figure 3:
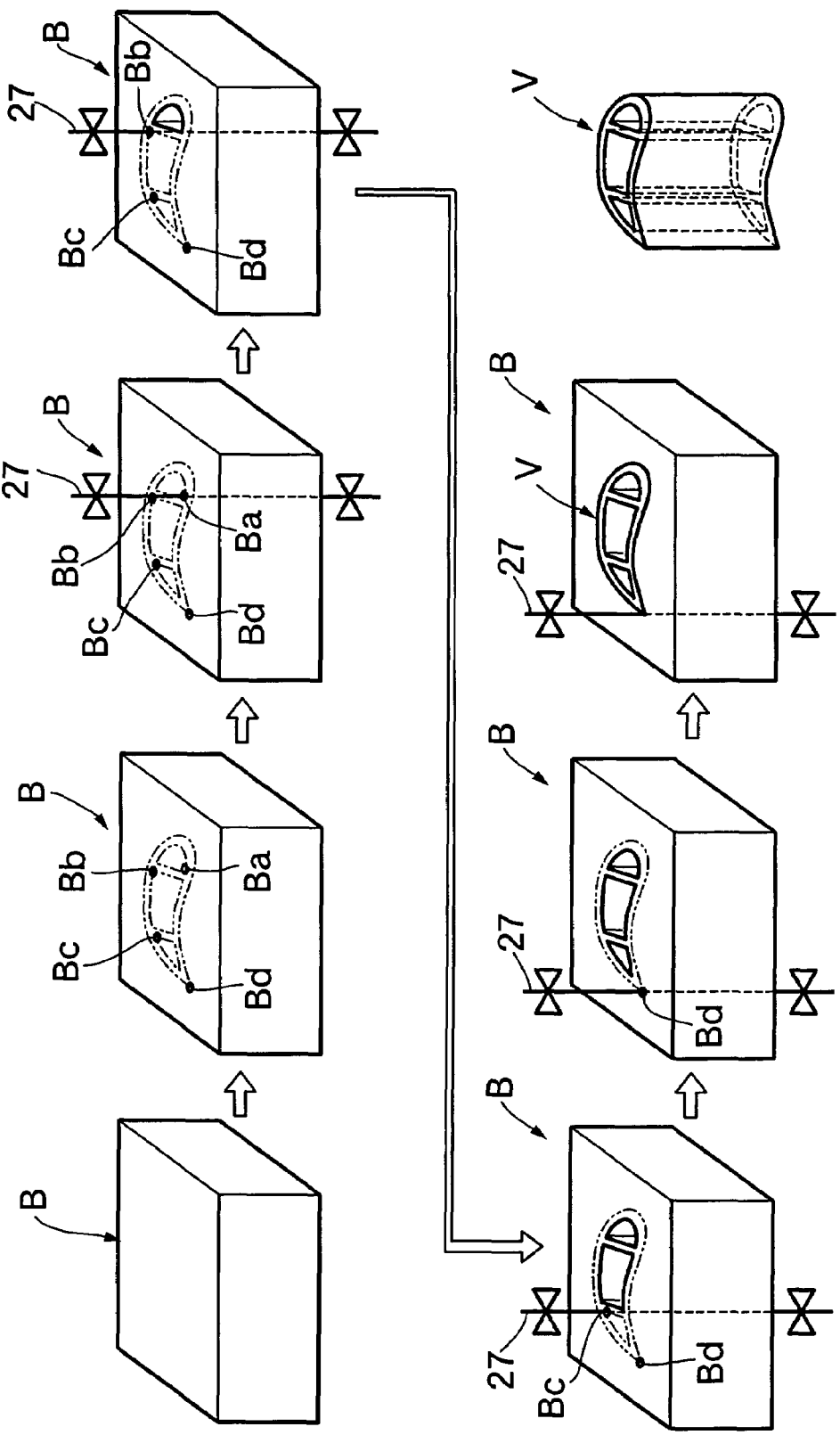
FIG. 3 is a diagram for explaining machining steps for the vane.

FIGS. 1 to 3 show an embodiment of the present invention.

As shown in FIG. 1, the sectional shape of a vane V of a double-slotted flap in a cord direction perpendicular to a span direction includes an outer skin area 15 surrounded by a first outer skin 11 on an upper surface, a second outer skin 12 on a lower surface, a leading edge 13 to which a front end of the first outer skin 11 and a rear end of the second outer skin 12 are connected, and a trailing edge 14 to which a rear end of the first outer skin 11 and a rear end of the second outer skin 12 are connected. In addition, front and rear reinforcing areas 16 and 17 constitute a web-shaped spar extending within the outer skin area 15 in the span direction to connect the first outer skin 11 and the second outer skin 12 to each other. The first outer skin 11 is curved upwardly, and a region from the front reinforcing area 16 to the vicinity of the rear reinforcing area 17 is a thickened portion 11a thicker than the other portions. The second outer skin 12 is substantially flat, and a region from the front reinforcing area 16 to the vicinity of the leading edge 13 is a thickened portion 12a thicker than the other portions. The vane V is integrally formed as a single member by wire electrical discharge machining.

FIG. 2 shows a wire electrical discharge machining apparatus for forming the vane V. A machining table 22 is disposed Within a machining tank 21 filled with an insulating oil, is connected to an actuator 24 and moved in an X-Y direction by the actuator 24 controlled by an NC unit 23. When the vane V has a sectional shape uniform in the span direction, the machining table 22 suffices to move only in the X-Y direction, but when the vane V is tapered in the span direction, the machining table 22 is required to swing about an X-axis and a Y-axis as well as to move in the X-Y direction.

A wire delivery bobbin 25 and a wire take-up bobbin 26 are connected to and rotated by a drive source (not shown), and mounted above the machining tank 21. A wire 27 delivered from the wire delivery bobbin 25 is fed to a first guide roller 28, a first wire guide 29, a second wire guide 30 and a second guide roller 31, to be wound around the wire take-up bobbin 26. A block B made of an aluminum alloy as a material for the vane V is clamped on the machining table 22 having an opening 22a through which the wire 27 can be passed. A feeder 33 leading to a plus terminal of a pulse power source 32 is in slidable abutment against the wire 27. A minus terminal of the pulse power source 32 is connected to the block B.

Steps of wire electrically discharge-machining of the vane V from the block B will be described below with reference to FIG. 3.

Four start holes Ba to Bd for receiving the wire 27 are formed in the block B. The wire 27 is inserted through the first start hole Ba. The actuator 24 is controlled in accordance with vane shape data stored in the NC unit 23 to move the machining table 22 and move the wire 27 by rotating the wire delivery bobbin 25 and the wire take-up bobbin 26 while applying a pulse voltage from the pulse power source 32. As a result, an electrical discharge occurs between the wire 27 and the block B, whereby the block B is melted/evaporated to be cut along the wire 27. After a region surrounded by the first outer skin 11, the leading edge 13, the second outer skin 12 and the front reinforcing area 16 is cut away in this manner: a region surrounded by the first outer skin 11, the rear reinforcing area 17, the second outer skin 12 and the front reinforcing area 16 is cut away starting from the second start hole Bb; and further a region surrounded by the first outer skin 11, the trailing edge 14, the second outer skin 12 and the rear reinforcing area 17 is cut away starting from the third start hole Bc. Finally, an outer periphery of the outer skin area 15 is cut away starting from the fourth start hole Bd, whereby the vane V is separated from the block B.

The vane V cut away from the block B by wire electrical discharge-machining has a box structure including the front and rear reinforcing areas 16 and 17 within the outer skin area 15 having a closed section, and hence has a high bending rigidity and a high torsional rigidity. The vane V has a simple structure being a single member, as compared with a conventional vane made by assembling a plurality of parts, so that the number of parts, the number of assembling steps and the weight can be reduced. Further, the vane V has no step generated on the outer skin area 15, so that drag can be reduced. Moreover, the vane V has no seam, so that the entrance of water can be prevented, thereby enhancing the durability against the corrosion.

The wall thickness of each portion of the vane V can be changed as desired in the cord direction by employing wire electrical discharge-machining. Also, the bending rigidity and the torsional rigidity of the vane V can be optimized while minimizing the increase in weight by means of the thickened portion 11a formed on the first outer skin 11 and the thickened portion 12a formed on the second outer skin 12. Further, the thickness of the trailing edge 14 at which the first outer skin 11 and the second outer skin 12 are converged can be decreased to be extremely small by employing wire electrical discharge machining, as compared with the conventional vane made by assembling plate materials. Because the thickness of the trailing edge 14 can be decreased to approximately zero, as described above, the turbulence of an air current at the trailing edge 14 can be prevented to contribute to a reduction in drag.

Although the embodiment of the present invention has been described in detail, it will be understood that various modifications may be made without departing from the subject matter of the present invention.

For example, the vane of the double-slotted flap has been illustrated in the embodiment as the blade member for an airplane, but the blade member for the airplane according to the present invention is not limited to the above-described vane, and encompasses rotor blades such as an aileron, an elevator, a rudder, a flap, an elevon, and various tubs associated therewith.

The vane V in the embodiment includes the two reinforcing areas 16 and 17, but the number of reinforcing areas maybe selected as desired.

As discussed above, according to the present invention, the outer skin area surrounded by the first outer skin, the second outer skin, the leading edge and the trailing edge each having the predetermined wall thickness is formed integrally with the reinforcing area extending in the span direction within the outer skin area and connected to the first outer skin and the second outer skin by wire electrical discharge machining, to thereby manufacture the blade member for the airplane. Therefore, the structure can be simplified, leading to reductions in the number of parts, number of assembling steps and weight, as compared with the conventional blade member for the airplane made by assembling the plurality of parts. Moreover, no step nor seam is generated on a surface of the outer skin area, so that the increase in drag and the generation of corrosion can be prevented.

According to the present invention, the wall thickness of the outer skin changes in the cord direction, so that the bending rigidity and the torsional rigidity of the blade member for the airplane can be optimized while minimizing an increase in weight. Especially, the wall thickness of the outer skin can be easily changed in the cord direction by employing wire electrical discharge-machining.

According to the present invention, the distance between outer surfaces of the first outer skin and the second outer skin is gradually decreasing toward the trailing edge to become approximately zero at the trailing edge, so that the turbulence of an air current at the trailing edge can be prevented to contribute to a reduction in drag. Especially, the wall thickness of the trailing edge can be easily reduced by employing wire electrical discharge-machining.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A blade member for an airplane, which constitutes at least a portion of a rotor blade of the airplane, said blade member comprising:
    an outer skin area surrounded by a first outer skin, a second outer skin, a leading edge and a trailing edge each having a predetermined wall thickness; and
    at least one reinforcing area extending in a span direction within the outer skin area and connected to the first outer skin and the second outer skin,
    wherein said outer skin area including said first outer skin, said second outer skin, said leading edge and said trailing edge and said reinforcing area are integrally formed from a single block by wire electrical discharge-machining, and
    wherein the wall thickness of the first outer skin includes a central portion that is thicker relative to a portion adjacent to the leading edge and a portion adjacent to the trailing edge,
    wherein two reinforcing areas are provided within the outer skin area for connecting the first outer skin to the second outer skin,
    wherein the at least one of wall thicknesses of said first outer skin and said second outer skin changes in a cord direction between a first of said two reinforcing areas and a second of said two reinforcing areas, with a portion the wall thickness of said first outer skin adjacent to the first of said two reinforcing area being thicker than a portion the wall thickness of said first outer skin adjacent to the second of the two reinforcing area.

2. The blade member for an airplane according to claim 1, wherein a distance between outer surfaces of said first outer skin and said second outer skin is gradually decreasing toward the trailing edge to become approximately zero at the trailing edge.

3. The blade member for an airplane according to claim 1, wherein the blade member is constructed of an aluminum alloy.

4. The blade member for an airplane according to claim 1, wherein the first outer skin is curved upwardly.

5. The blade member for an airplane according to claim 1, wherein said second outer skin is substantially flat.

6. A blade member for an airplane, which constitutes at least a portion of a rotor blade of the airplane and has an asymmetrical cross-sectional shape as viewed in a span direction, said blade member comprising:
    an outer skin area elongated in the span direction and surrounded by a first outer skin, a second outer skin, a leading edge and a trailing edge each having a predetermined wall thickness; and
    at least one reinforcing area extending in the span direction within the outer skin area and connected to the first outer skin and the second outer skin,
    wherein the first outer skin and the second outer skin each have a thick wall portion and a thin wall portion, wherein the thick wall portions of the first and second outer skins are offset relative to each other in a cord direction, and wherein said outer skin area including said first outer skin, said second outer skin, said leading edge and said trailing edge and said reinforcing area are integrally formed from a single block by wire electrical discharge-machining.

7. The blade member for an airplane according to claim 6, wherein the thick wall portion of the second outer skin is forward in the cord direction relative to the thick wall portion of the first outer skin.

8. The blade member for an airplane according to claim 6, wherein said outer skin area including said first outer skin, said second outer skin, said leading edge and said trailing edge and said reinforcing area are integrally formed from a single block by wire electrical discharge-machining.

* * * * *